(12) United States Patent
Kimble

(10) Patent No.: US 12,202,564 B2
(45) Date of Patent: Jan. 21, 2025

(54) VEHICLE HAVING A SADDLE RIDING VEHICLE AND A SIDECAR COUPLED TO THE SADDLE RIDING VEHICLE

(71) Applicant: Honda Motor Co., Ltd., Tokyo (JP)

(72) Inventor: Nathan Kimble, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 18/172,673

(22) Filed: Feb. 22, 2023

(65) Prior Publication Data

US 2024/0278867 A1    Aug. 22, 2024

(51) Int. Cl.
| | | |
|---|---|---|
| *B62J 45/20* | (2020.01) | |
| *B62J 45/41* | (2020.01) | |
| *B62K 27/12* | (2006.01) | |
| *G01L 3/10* | (2006.01) | |
| *B62J 45/42* | (2020.01) | |

(52) U.S. Cl.
CPC .............. *B62J 45/20* (2020.02); *B62J 45/41* (2020.02); *B62K 27/12* (2013.01); *G01L 3/108* (2013.01); *B62J 45/42* (2020.02); *B62K 2204/00* (2013.01)

(58) Field of Classification Search
None
See application file for complete search history.

(56) References Cited

U.S. PATENT DOCUMENTS

| | | |
|---|---|---|
| 6,516,925 B1 | 2/2003 | Napier et al. |
| 10,239,369 B2 | 3/2019 | Guntersweiler et al. |
| 2020/0290701 A1 * | 9/2020 | Chang ................ B62K 27/02 |
| 2020/0384824 A1 * | 12/2020 | Breazlan .............. B60G 21/06 |
| 2021/0354753 A1 | 11/2021 | Micaelli et al. |

FOREIGN PATENT DOCUMENTS

| | | | |
|---|---|---|---|
| CN | 216887090 U | 7/2022 | |
| DE | 102010019480 A1 | 11/2011 | |
| DE | 102010051838 A1 | 5/2012 | |
| DE | 102017204760 A1 | 9/2018 | |
| FI | 127324 B | 3/2018 | |
| FR | 2735087 A1 * | 12/1996 | ............. B62K 27/00 |
| FR | 2966797 B1 | 5/2013 | |
| NL | 8501504 A * | 12/1986 | ............. B62K 27/00 |
| WO | 2021150160 A1 | 7/2021 | |

* cited by examiner

*Primary Examiner* — Peter D Nolan
*Assistant Examiner* — Jacob Kent Besteman-Street
(74) *Attorney, Agent, or Firm* — Mark Duell; American Honda Motor Co., Inc.

(57) ABSTRACT

A vehicle includes a saddle riding vehicle and a sidecar coupled to the saddle riding vehicle. The sidecar includes a wheel configured to facilitate a movement of the sidecar on a road, and at least one electric motor operatively coupled to the wheel to rotate the wheel. At least two bars extend from the sidecar to the saddle riding vehicle and couples the sidecar to the saddle riding vehicle. Moreover, the vehicle includes load sensors mounted on the at least two bars to detect a measure of a yaw torque acting on the vehicle. A controller is configured to determine the yaw torque acting on the vehicle based on inputs received from the load sensors, and control the electric motor to control a wheel torque provided to the wheel of the sidecar by the electric motor to reduce the yaw torque acting on the vehicle.

20 Claims, 2 Drawing Sheets

VEHICLE HAVING A SADDLE RIDING VEHICLE AND A SIDECAR COUPLED TO THE SADDLE RIDING VEHICLE

BACKGROUND

The disclosed subject matter relates generally to vehicles. More particularly, the disclosed subject matter relates a vehicle having a saddle riding vehicle and a powered sidecar attached to the saddle riding vehicle.

Motorcycle sidecars, generally, are attached and arranged on a side of a motorcycle to facilitate a seating of a person, and are generally driven by the power source of the motorcycle. However, during movement of such vehicles for example, during acceleration or braking, a yaw torque acts on the vehicle pulling the vehicle either on the right and left due to the opposing forces acting at an offset on the motorcycle and the sidecar. For example, during acceleration, a net drive force acts on the motorcycle in a direction of the motion of the vehicle, while an inertial force acts on sidecar in direction opposite to the movement of the sidecar. As the net drive force and the inertial force act in opposite directions and at an offset from each other, a yaw torque acts on the vehicle, pulling the vehicle towards right. Accordingly, such yaw torque decreases the riding stability and compromise the steering capability of the vehicle, which is undesirable.

SUMMARY

In accordance with one embodiment of the present disclosure, a vehicle is disclosed. The vehicle includes a saddle riding vehicle and a sidecar coupled to the saddle riding vehicle. The sidecar includes a wheel configured to facilitate a movement of the sidecar on a road, and at least one electric motor operatively coupled to the wheel and configured to rotate the wheel. The vehicle also includes at least two bars extending from the sidecar to the saddle riding vehicle and coupling the sidecar to the saddle riding vehicle. Moreover, the vehicle includes a plurality of load sensors mounted on the at least two bars and configured to detect a measure of a yaw torque acting on the vehicle during a movement of the vehicle on the road. Furthermore, the vehicle includes a controller communicatively coupled to the plurality of load sensors and the at least one electric motor. The controller is configured to determine the yaw torque acting on the vehicle based on inputs received from the plurality of load sensors, and control the at least one electric motor to control a wheel torque provided to the wheel of the sidecar by the at least one electric motor to reduce the yaw torque acting on the vehicle.

In accordance with another embodiment of the present disclosure, a sidecar for a vehicle having a saddle riding vehicle is provided. The sidecar includes at least two bars configured to be coupled to the saddle riding vehicle to facilitate a coupling of the sidecar to the saddle riding vehicle, and a wheel configured to facilitate a movement of the sidecar on a road. The sidecar also includes at least one electric motor operatively coupled to the wheel and configured to rotate the wheel, and a plurality of load sensors mounted on the at least two bars and configured to detect a measure of a yaw torque acting on the vehicle during a movement of the vehicle on the road. The sidecar further includes a controller communicatively coupled to the plurality of load sensors and the at least one electric motor. The controller is configured to determine the yaw torque acting on the vehicle based on inputs received from the plurality of load sensors, and control the at least one electric motor to control a wheel torque provided to the wheel of the sidecar by the at least one electric motor to reduce the yaw torque.

In accordance with yet a further embodiment of the present disclosure, a control system for controlling a vehicle is disclosed. The vehicle includes a saddle riding vehicle and a sidecar coupled to the saddle riding vehicle. The sidecar includes a wheel and at least two bars coupling the sidecar to the saddle riding vehicle. The control system comprises at least one electric motor operatively coupled to the wheel and configured to rotate the wheel, and a plurality of load sensors mounted on the at least two bars and configured to detect a measure of a yaw torque acting on the vehicle during a movement of the vehicle on the road. The control system also includes a controller communicatively coupled to the plurality of load sensors and the at least one electric motor. Moreover, the controller is configured to determine the yaw torque acting on the vehicle based on inputs received from the plurality of load sensors, and control the at least one electric motor to control a wheel torque provided to the wheel of the sidecar by the at least one electric motor to reduce the yaw torque below a threshold value.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-2, wherein like numbers indicate the same or corresponding elements throughout the views.

Figure 1:
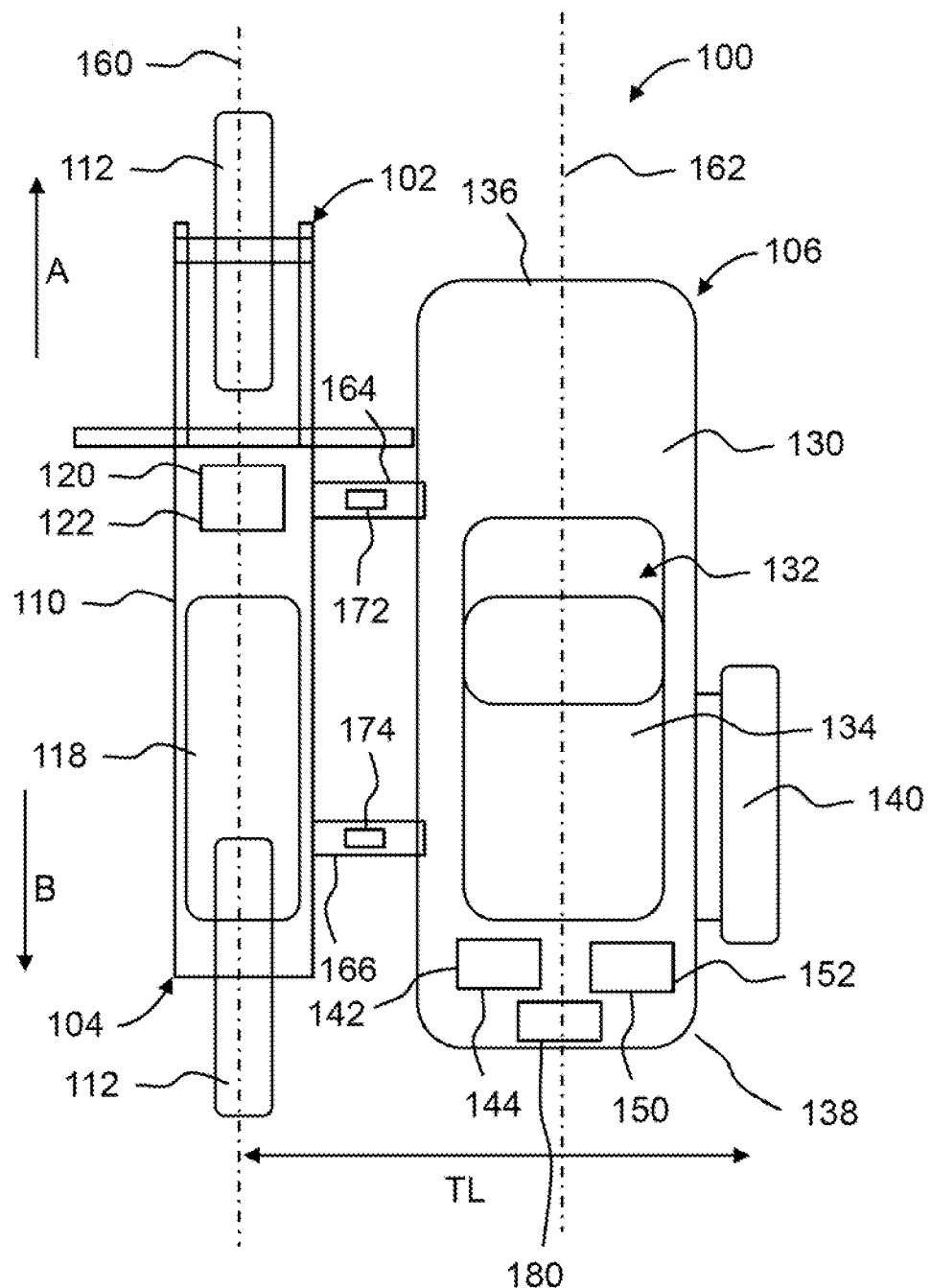
FIG. 1 is a schematic view of a vehicle having a saddle riding vehicle and a sidecar coupled to the saddle riding vehicle, in accordance with one embodiment of the present disclosure.

FIG. 1 illustrates a schematic view of a vehicle, indicated generally at 100, in accordance with one embodiment of the present disclosure. As shown, the vehicle 100 includes a saddle riding vehicle 102, for example, a motorcycle 104, and a sidecar 106 coupled to the saddle riding vehicle 102. Although the saddle riding vehicle 102 is contemplated as the motorcycle 104, it may be envisioned that the saddle riding vehicle 102 may be a scooter or any other similar vehicle known in the art.

As schematically depicted in FIG. 1, the motorcycle 104 includes a frame 110, a pair of wheels, for example, a front wheel 112 and a rear wheel 114, coupled to the frame 110 and adapted to rotate to enable a movement of the motorcycle 104 over a path, and a seat 118 supported on the frame 110 to facilitate a seating of at least one person on the motorcycle 104. Further, the motorcycle 104 includes a power source 120, for example, an engine 122, operatively coupled to one of the wheels, for example, the rear wheel 114, to rotate the rear wheel 114 and propel the motorcycle 104 in a forward direction. Although the power source 120 is contemplated as the engine 122, it may be appreciated that the power source 120 may be an electric motor configured to convert an electrical energy into rotational energy to drive the rear wheel 114. Also, the motorcycle 104 may include a transmission (not shown) coupling the power source 120 to the rear wheel 114 to transfer desired torque and speed to the rear wheel 114 from the power source 120. The transmission may be an automatic transmission or a manual transmission.

Moreover, the sidecar 106 includes a body 130 defining an open passenger compartment 132 including a seat 134 to enable a seating of a person inside the sidecar 106. The body 130 includes a front end 136 arranged proximate to a front end of the motorcycle 104 and a rear end 138 arranged proximate to a rear end of the motorcycle 104. Further, the sidecar 106 includes a traction member, for example, a wheel 140, supporting the body 130 on a surface, enabling the propelling of the sidecar 106 over a path besides the motorcycle 104. As shown, the wheel 140 is disposed on a first side, i.e., right side of the sidecar 106, while the motorcycle 104 is arranged on a second side i.e., left side of the sidecar 106. Also, the wheel 140 is shown to be arranged proximate to the rear end 138 of the sidecar 106. However, the wheel 140 may be arranged at a front of the sidecar 106 or at any location between the front and rear of the sidecar 106.

Further, the sidecar 106 includes an electric drive unit 150 having at least one electric motor 152 operatively coupled to the wheel 140 to rotate the wheel 140. To provide the electrical energy to the at least one electric motor 152 of the sidecar 106, the sidecar 106 may include an power storage unit 142, for example, at least one battery 144 electrically coupled to the at least one electric motor 152 and configured to supply electrical power to the at least one electric motor 152. Although the battery 144 is contemplated as the power storage unit 142, it may be appreciated that the power storage unit 142 may include supercapacitors, ultracapacitors, or a combination thereof. Also, the sidecar 106 is configured to be moved/driven along the motorcycle 104.

Accordingly, the sidecar 106 may be coupled to the frame 110 of the motorcycle 104, as shown in FIG. 1. As illustrated, the sidecar 106 is arranged on a right side of the motorcycle 104 such that a longitudinal axis 162 of the sidecar 106 is arranged substantially parallel to and spaced apart from a longitudinal axis 160 of the motorcycle 104. To couple the sidecar 106 with the motorcycle 104, the vehicle 100 includes a plurality of bars, for example, a pair of bars 164, 166, extending from the sidecar 106 to the motorcycle 104 and coupled to the sidecar 106 and the motorcycle 104. In some embodiments, the bars 164, 166 extend in a direction substantially perpendicularly to the longitudinal axis 162 of the sidecar 106. In an embodiment, the pair of bars 164, 166 may be fixedly attached to the sidecar 106, while the bars 164, 166 may be removably coupled to the frame 110 of the motorcycle 104 to enable a selective attachment and detachment of the sidecar 106 with the motorcycle 104. Accordingly, the bars 164, 166 are components of the sidecar 106.

The vehicle 100 further includes a plurality of load sensors, for example, at least one first load sensor 172 and at least one second load sensor 174, mounted/attached to the bars 164, 166. As illustrated in FIG. 1, the at least one first load sensor 172 is mounted on a first bar 164, while the at least one second load sensor 174 is mounted on a second bar 166. The load sensors 172, 174 are configured to measure the tensile and compression loads coming on the bars 164, 166 during a travel of the vehicle 100. For example, the loads sensors 172, 174 are configured and arranged on the bars 172, 174 such that the loads sensors 172, 174 measure loads coming on the bars 164, 166 corresponding to a yaw torque acting on the vehicle 100 during the travelling of the vehicle 100. Yaw torque acts on the vehicle 100 during an acceleration of the vehicle 100 as well as a braking of the vehicle 100 due to a net force acting on the motorcycle 104 and a net force acting on the sidecar 106 are in opposite directions. Yaw torque acting on the vehicle 100 tends to pull or rotate the vehicle 100 towards either right or left.

For example, during acceleration of the vehicle 100, a drive force is acting on the motorcycle 104 in a first direction 'A' (i.e., in the direction of movement of the vehicle 100) while a frictional or inertial force acts on the motorcycle 104 in a second direction 'B' opposite to the first direction 'A'. It may be appreciated that for the simplicity purpose, the both the drive force and the friction force is acting along the longitudinal axis 160 of the motorcycle 104. Similarly, an inertial force/frictional force is acting on the sidecar 106 in the second direction 'B' and along the longitudinal axis 162 of the sidecar 106. Accordingly, a net drive force is acting on the motorcycle 104 in the first direction 'A' along the longitudinal axis 160 of the motorcycle 104, propelling the vehicle 100 in the first direction 'A', while a net frictional/inertial force is acting on the sidecar 106 in the second direction 'B' along the longitudinal axis 162 of the sidecar 106. Accordingly, a yaw torque is acting on the vehicle 100 about a vertical/yaw axis, causing the rotation of the vehicle 100 towards right. Such yaw torque acting on the vehicle 100 generates compression and tension forces in the bars 164, 166. For example, the during acceleration of the vehicle, a tensile force acts on the first bar 164, while a compressive force acts on the second bar 166. The load sensors 172, 174 measures the values of such forces on the bars 164, 166, and share the data with a controller 180 of the vehicle 100, which in turn determines/calculates a value of the yaw torque acting on the vehicle 100. In some embodiments, the load sensors 172, 174 may be strain gauges. However, it may be appreciated that other type of load sensors, for example, torque sensors, suitable to measure the yaw torque or forces corresponding to the yaw torque acting on the vehicle 100 may be utilized. It may be appreciated that the load sensors 172, 174 are measuring/detecting/determining the yaw torque or the measure of the yaw torque in real time, and shares the information with the controller 180.

Figure 2:
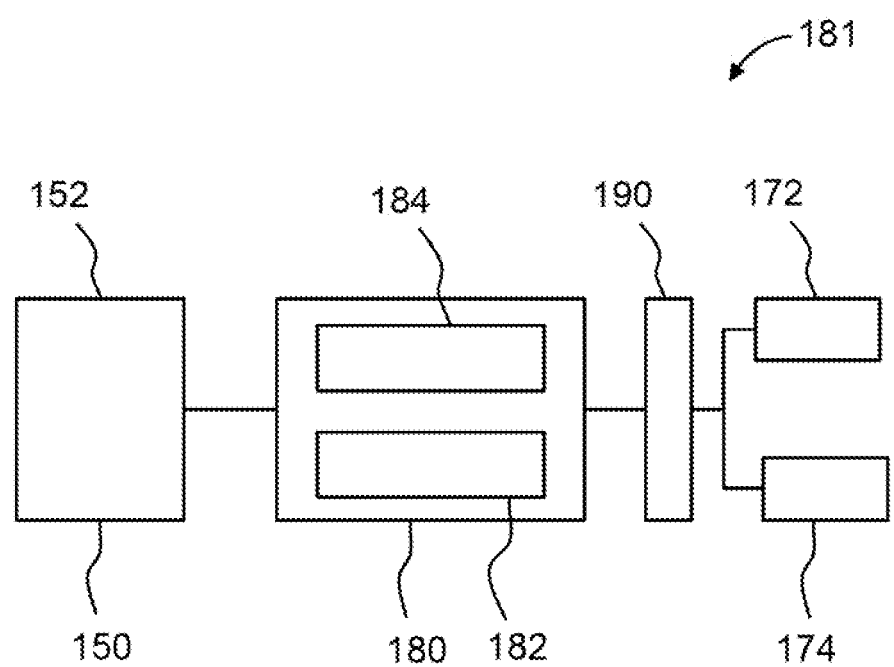
FIG. 2 is a schematic view of a control system of the vehicle of FIG. 1, in accordance with one embodiment of the present disclosure.

The controller 180, in an embodiment, may be an electronic control module (ECM), of the vehicle 100 or the sidecar 106, and is configured to receive information from various sensors, for example, load sensors 172, 174, process the information received from the sensors, and control one or more component, for example, the at least one electric motor 152, and other auxiliary systems of the vehicle 100. In some embodiments, the plurality of load sensors 172, 174, the at least one electric motor 152, and the controller 180 together define a control system 181 of the vehicle 100 and/or the sidecar 106, as shown in FIG. 2. As shown, the controller 180 may include a processor 182 for executing specified instructions, which controls and monitors various functions associated with the vehicle 100. The processor 182 may be operatively connected to a memory 184 for storing instructions related to the control of the vehicle 100 and vehicle components.

The memory 184 as illustrated is integrated into the controller 180, but those skilled in the art will understand that the memory 184 may be separate from the controller 180 but onboard the vehicle 100, and/or remote from the controller 180 and the vehicle 100, while still being associated with and accessible by the controller 180 to store information in and retrieve information from the memory 184 as necessary during the operation of the vehicle 100. Although the processor 180 is shown, it is also possible and contemplated to use other electronic components such as a microcontroller, an application specific integrated circuit (ASIC) chip, or any other integrated circuit device. While the discussion provided herein relates to the functionality of at least one electric motor 152, the controller 180 may be configured to control other aspects of the operation of the vehicle 100. Moreover, the controller 180 may refer collectively to multiple control and processing devices across which the functionality of the drive control system and other systems of the vehicle 100 may be distributed. For example, the at least one electric motor 152 and the load sensors 172, 174 may each have one or more controllers that communicate with the controller 180. Such variations in consolidating and distributing the processing of the controller 180 as described herein are contemplated as having use in braking reduction and transmission control in accordance with the present disclosure.

In some embodiments, the vehicle 100 may include a low pass filter 190 arranged in communication with the load sensors 172, 174, and configured to the receive the data from the load sensors 172, 174. The low pass filter 190 removes noise from the data received from the load sensors 172, 174 and shares the filtered data to the controller 180. In some embodiments, the low pass filter 190 may be omitted. Further, the controller 180 is configured to determine a value of a sidecar drive force to be applied to the vehicle 100 based on the value of the determined yaw torque to reduce the net yaw torque acting on the vehicle equal to or below a threshold value. For so doing, the controller 180 determines/calculates a wheel torque provided to the wheel 140 of the sidecar 106 by the at least one electric motor 152. In an embodiment, the controller 180 determines/calculates the wheel torque for the wheel 140 when the yaw torque acting on the vehicle 100 vehicle is above the threshold value. In some embodiments, the threshold value is a predefined value. Alternatively, the threshold value may depend on one or more parameters of the power storage unit 142 and/or drive mode of the saddle riding vehicle 102. In one embodiment, the one or more parameters of the power storage unit 142 includes a state of charge, a state of voltage, an age of the power storage unit, or a combination thereof.

To calculate the wheel torque, the controller 180 may determine an opposing yaw torque to be applied on the vehicle 100 to reduce the yaw torque below the threshold value. In some opposing yaw torque based on the yaw torque measured/determined based on data from the load sensor 172, 174 and a feedback value derived based on the previously determined/calculated opposing yaw torque. In some embodiments, the controller 180 may determine/calculate the opposing yaw torque to be applied on the vehicle 100 as zero when the determined yaw torque is below the threshold value.

Subsequently, the controller 180 may calculate/determine a wheel force to be applied on the wheel 140 based on the determined opposing yaw torque. For so doing, in some embodiments, the controller 180 by dividing the value of the opposing yaw torque with a wheel track length. As illustrated in FIG. 1, the wheel track length 'TL' is a distance between the rear wheel 114 of the motorcycle 104 and the wheel 140 of the sidecar 106. The controller 180 utilizes the calculated wheel force to calculate the wheel torque to be provided by the at least one electric motor 152 to the wheel 140 of the sidecar. For so doing, in some embodiments, the controller 180 may multiply the wheel force with a radius of the wheel 140. Upon determining/calculating the wheel torque, the controller 180 controls the at least one electric motor 152 to provide the determined wheel torque. This wheel torque generates a net sidecar drive force that acts in a direction of the net drive force of the motorcycle 104 to reduce the yaw torque acting on the vehicle 100. Accordingly, the controller 180 controls the at least one electric motor 152 to generate a suitable wheel torque such that the net yaw torque acting on the vehicle remains or is reduced below or equal to the threshold value. It may be appreciated that the yaw torque acting on the vehicle 100 due to the net force acting on the motorcycle 104 and the sidecar 106 depends on the loading of the motorcycle 104, a speed of the motorcycle 104, a loading of the sidecar 106, and steering angle, etc. Accordingly, the yaw torque acting on the vehicle 100 is measured continuously through the load sensors 172, 174 positioned/mounted on the bars 164, 166 and the feedback value is used to determine the opposing yaw torque to determine the suitable wheel torque to reduce or keep the yaw torque acting on the vehicle 100 equal to or below the threshold value. As the at least one electric motor 152 is driving the wheel 140 of the sidecar 106, to cancel/reduce the yaw torque on the vehicle 100, the sidecar 106 is pulling itself on the road.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle, comprising:
   a saddle riding vehicle;
   a sidecar coupled to the saddle riding vehicle and including
      a wheel configured to facilitate a movement of the sidecar on a road, and
      at least one electric motor operatively coupled to the wheel and configured to rotate the wheel; and
   at least two bars extending from the sidecar to the saddle riding vehicle and coupling the sidecar to the saddle riding vehicle;
   a plurality of load sensors mounted on the at least two bars and configured to detect a measure of a yaw torque acting on the vehicle during a movement of the vehicle on the road; and
   a controller communicatively coupled to the plurality of load sensors and the at least one electric motor and configured to
      determine the yaw torque acting on the vehicle based on inputs received from the plurality of load sensors, and control the at least one electric motor to control a wheel torque provided to the wheel of the sidecar by the at least one electric motor to reduce the yaw torque acting on the vehicle.

2. The vehicle of claim 1, wherein the plurality of load sensors includes
at least one first load sensor mounted on one or more of the at least two bars, and
at least one second load sensor mounted on one or more of the at least two of bars,
wherein the at least one first load sensor and the at least one second load sensor are configured to measure tensile or compressive load on the at least two bars.

3. The vehicle of claim 1, each of the plurality of load sensors is a strain gauge.

4. The vehicle of claim 1, wherein the controller is configured to control the at least one electric motor to reduce the yaw torque acting on the vehicle equal to or below a threshold value.

5. The vehicle of claim 4, wherein the controller is configured to determine the threshold value based on at least one of a drive mode of the saddle riding vehicle or one or more parameters of a power storage unit providing electrical power to the at least one electric motor.

6. The vehicle of claim 1, wherein the controller is configured to determine the wheel torque based on the determined yaw torque.

7. The vehicle of claim 1 further including a low pass filter arranged configured to filter data received from the plurality of load sensors and shares the filtered data to the controller.

8. The vehicle of claim 1, wherein the controller is configured to
determine an opposing yaw torque to be applied on the vehicle based on the determined yaw torque, and
utilizing a previously determined opposing yaw torque as feedback to calculate the wheel torque.

9. A sidecar for a vehicle having a saddle riding vehicle, the sidecar comprising:
at least two bars configured to be coupled to the saddle riding vehicle to facilitate a coupling of the sidecar to the saddle riding vehicle;
a wheel configured to facilitate a movement of the sidecar on a road;
at least one electric motor operatively coupled to the wheel and configured to rotate the wheel;
a plurality of load sensors mounted on the at least two bars and configured to detect a measure of a yaw torque acting on the vehicle during a movement of the vehicle on the road; and
a controller communicatively coupled to the plurality of load sensors and the at least one electric motor and configured to
determine the yaw torque acting on the vehicle based on inputs received from the plurality of load sensors, and
control the at least one electric motor to control a wheel torque provided to the wheel of the sidecar by the at least one electric motor to reduce the yaw torque.

10. The sidecar of claim 9, wherein the plurality of load sensors includes
at least one first load sensor mounted on one or more of the at least two bars, and
at least one second load sensor mounted on one or more of the at least two bars,
wherein the at least one first load sensor and the at least one second load sensor are configured to measure tensile or compressive load on the at least two bars.

11. The sidecar of claim 9, each of the plurality of load sensors is a strain gauge.

12. The sidecar of claim 9, wherein the controller is configured to control the at least one electric motor to keep the yaw torque acting on the vehicle equal to or below a threshold value.

13. The sidecar of claim 12, wherein the controller is configured to determine the threshold value based on at least one of a drive mode of the saddle riding vehicle or one or more parameters of a power storage unit providing electrical power to the at least one electric motor.

14. The sidecar of claim 9, wherein the controller is configured to determine the wheel torque based on the determined yaw torque.

15. The sidecar of claim 9 further including a low pass filter arranged configured to filter data received from the plurality of load sensors and shares the filtered data to the controller.

16. The sidecar of claim 9, wherein the controller is configured to
determine an opposing yaw torque to be applied on the vehicle based on the determined yaw torque, and
utilizing a previously determined opposing yaw torque as feedback to calculate the wheel torque.

17. A control system for controlling a vehicle including a saddle riding vehicle and a sidecar coupled to the saddle riding vehicle, wherein the sidecar includes a wheel and at least two bars coupling the sidecar to the saddle riding vehicle, the control system comprising:
at least one electric motor operatively coupled to the wheel and configured to rotate the wheel;
a plurality of load sensors mounted on the at least two bars and configured to detect a measure of the yaw torque acting on the vehicle during a movement of the vehicle on the road; and
a controller communicatively coupled to the plurality of load sensors and the at least one electric motor and configured to
determine the yaw torque acting on the vehicle based on inputs received from the plurality of load sensors, and
control the at least one electric motor to control a wheel torque provided to the wheel of the sidecar by the at least one electric motor to reduce the yaw torque below a threshold value.

18. The control system of claim 17, wherein the plurality of load sensors includes
at least one first load sensor mounted on one or more of the at least two bars, and
at least one second load sensor mounted on one or more of the at least two bars,
wherein the at least one first load sensor and the at least one second load sensor are configured to measure tensile or compressive load on the at least two bars.

19. The control system of claim 17, each of the plurality of load sensors is a strain gauge.

20. The control system of claim 17, wherein the controller is configured to
determine an opposing yaw torque to be applied on the vehicle based on the determined yaw torque, and
utilizing a previously determined opposing yaw torque as feedback to calculate the wheel torque.

* * * * *